US012784614B2

(12) United States Patent
Gatzemeyer

(10) Patent No.: US 12,784,614 B2
(45) Date of Patent: *Nov. 3, 2026

(54) ORAL CARE SYSTEM AND METHOD

(71) Applicant: Colgate-Palmolive Company, New York, NY (US)

(72) Inventor: John Gatzemeyer, Hillsborough, NJ (US)

(73) Assignee: Colgate-Palmolive Company, New York, NY (US)

(*) Notice: Subject to any disclaimer, the term of this patent is extended or adjusted under 35 U.S.C. 154(b) by 151 days.

This patent is subject to a terminal disclaimer.

(21) Appl. No.: 17/302,326

(22) Filed: Apr. 30, 2021

(65) Prior Publication Data

US 2021/0256871 A1 Aug. 19, 2021

Related U.S. Application Data

(63) Continuation of application No. 15/350,285, filed on Nov. 14, 2016, now Pat. No. 11,043,141.

(51) Int. Cl.

| | |
|---|---|
| ***G09B 19/00*** | (2006.01) |
| ***A46B 9/04*** | (2006.01) |
| ***A46B 15/00*** | (2006.01) |
| ***A61C 17/22*** | (2006.01) |

(52) U.S. Cl.

CPC ............ *G09B 19/0084* (2013.01); *A46B 9/04* (2013.01); *A46B 15/0002* (2013.01); *A46B 15/0004* (2013.01); *A46B 15/0006* (2013.01); *A46B 15/0008* (2013.01); *A46B 15/0012* (2013.01); *A61C 17/22* (2013.01); *A46B 2200/1066* (2013.01)

(58) Field of Classification Search

CPC ........................................................ A46B 9/04

See application file for complete search history.

(56) References Cited

U.S. PATENT DOCUMENTS

| | | | |
|---|---|---|---|
| 4,253,212 | A | 3/1981 | Fujita |
| 4,450,599 | A | 5/1984 | Scheller et al. |
| 5,383,244 | A | 1/1995 | Ahrens et al. |

(Continued)

FOREIGN PATENT DOCUMENTS

| | | |
|---|---|---|
| AU | 2001252198 | 9/2002 |
| CA | 2285781 | 4/2000 |

(Continued)

OTHER PUBLICATIONS

International Search Report and Written Opinion of the International Searching Authority in International Application No. PCT/US2017/061312, mailed Feb. 27, 2018.

(Continued)

*Primary Examiner* — Xuan M Thai
*Assistant Examiner* — Sadaruz Zaman

(57) ABSTRACT

In one embodiment, the invention can be an oral care system that includes a toothbrush; a user interface configured to receive a brushing goal from a user; and a programmable processor operably coupled to the user interface. The programmable processor can be configured to receive brushing goal data indicative of the brushing goal received by the user interface; and determine, based at least in part on the brushing goal data, a suggested brushing routine and a brushing evaluation for a brushing session.

12 Claims, 10 Drawing Sheets

(56) References Cited

U.S. PATENT DOCUMENTS

| | | | | | |
|---|---|---|---|---|---|
| 5,561,881 | A | | 10/1996 | Klinger et al. | |
| 5,815,872 | A | | 10/1998 | Meginniss, III et al. | |
| 5,876,207 | A | | 3/1999 | Sundius et al. | |
| 5,894,620 | A | | 4/1999 | Polaert et al. | |
| 5,930,858 | A | * | 8/1999 | Jung | A61C 17/22 368/10 |
| 5,944,531 | A | * | 8/1999 | Foley | G09B 23/283 434/262 |
| 6,029,303 | A | | 2/2000 | Dewan | |
| 6,314,907 | B1 | | 11/2001 | Harris et al. | |
| 6,326,884 | B1 | | 12/2001 | Wohlrabe | |
| 6,327,734 | B1 | | 12/2001 | Meginniss, III et al. | |
| 6,425,295 | B1 | | 7/2002 | Meginniss | |
| 6,453,497 | B1 | | 9/2002 | Chiang et al. | |
| 6,468,076 | B2 | | 10/2002 | Kawamura | |
| 6,536,068 | B1 | | 3/2003 | Yang et al. | |
| 6,611,780 | B2 | | 8/2003 | Lundell et al. | |
| 6,630,730 | B2 | | 10/2003 | Grigg | |
| 6,685,471 | B1 | | 2/2004 | Kawamura et al. | |
| 6,735,802 | B1 | | 5/2004 | Lundell et al. | |
| 6,739,012 | B2 | | 5/2004 | Grez et al. | |
| 6,786,732 | B2 | | 9/2004 | Savill et al. | |
| 6,923,409 | B2 | | 8/2005 | Strunk | |
| 7,120,960 | B2 | | 10/2006 | Hilscher et al. | |
| 7,163,847 | B2 | | 1/2007 | Antesberger et al. | |
| 7,249,952 | B2 | | 7/2007 | Ranta et al. | |
| 7,264,026 | B2 | | 9/2007 | Gruber et al. | |
| 7,411,511 | B2 | | 8/2008 | Kennish et al. | |
| 7,467,946 | B2 | | 12/2008 | Rizoiu et al. | |
| 7,682,153 | B2 | | 3/2010 | Hilfinger et al. | |
| 7,748,069 | B2 | | 7/2010 | Dawley | |
| 7,774,886 | B2 | | 8/2010 | Hilscher et al. | |
| 7,976,388 | B2 | | 7/2011 | Park et al. | |
| 8,065,164 | B2 | | 11/2011 | Hwang | |
| 8,075,316 | B2 | | 12/2011 | Krause et al. | |
| 8,161,792 | B2 | | 4/2012 | Schlueter et al. | |
| 8,171,591 | B2 | | 5/2012 | Hall et al. | |
| 8,172,574 | B2 | | 5/2012 | Hilfinger et al. | |
| 8,175,840 | B2 | | 5/2012 | Hwang et al. | |
| 8,201,295 | B2 | | 6/2012 | Gatzemeyer et al. | |
| 8,214,958 | B2 | | 7/2012 | Pinyayev et al. | |
| 8,218,711 | B2 | | 7/2012 | Neyer | |
| 8,256,979 | B2 | | 9/2012 | Hilscher et al. | |
| 8,272,091 | B2 | | 9/2012 | Hwang et al. | |
| 8,296,686 | B1 | | 10/2012 | Tedesco et al. | |
| 8,332,186 | B2 | | 12/2012 | Bates et al. | |
| 8,337,213 | B2 | | 12/2012 | Puurunen et al. | |
| 8,381,571 | B2 | | 2/2013 | Wilhelm et al. | |
| 8,393,037 | B2 | | 3/2013 | Iwahori et al. | |
| 8,444,416 | B2 | | 5/2013 | Chenvainu et al. | |
| 8,533,892 | B2 | * | 9/2013 | Dabrowski | A46B 15/0004 15/167.1 |
| 8,544,131 | B2 | | 10/2013 | Braun et al. | |
| 8,595,882 | B2 | | 12/2013 | Bax et al. | |
| 8,690,579 | B2 | | 4/2014 | Ikkink et al. | |
| 8,744,192 | B2 | | 6/2014 | Ortins et al. | |
| 8,769,758 | B2 | | 7/2014 | Jungnickel et al. | |
| 8,789,227 | B2 | | 7/2014 | Cook et al. | |
| 8,801,763 | B2 | | 8/2014 | Fish et al. | |
| 8,832,895 | B2 | | 9/2014 | Jungnickel et al. | |
| 8,839,476 | B2 | | 9/2014 | Adachi | |
| 8,863,343 | B2 | | 10/2014 | Iwahori | |
| 8,938,839 | B2 | | 1/2015 | Kitagawa et al. | |
| 8,944,813 | B2 | | 2/2015 | Kotlarchik | |
| 8,947,358 | B2 | | 2/2015 | Vetter | |
| 8,966,696 | B2 | | 3/2015 | Hall | |
| 8,970,141 | B2 | | 3/2015 | Bax et al. | |
| 8,972,882 | B2 | | 3/2015 | Berry | |
| 9,009,901 | B2 | | 4/2015 | Doll et al. | |
| 9,049,920 | B2 | | 6/2015 | Bernhard et al. | |
| 9,072,370 | B2 | | 7/2015 | Gatzemeyer et al. | |
| 9,105,197 | B2 | * | 8/2015 | Meriheinae | A46B 15/0044 |
| 9,113,700 | B2 | | 8/2015 | Bates et al. | |
| 9,192,762 | B2 | | 11/2015 | Doll et al. | |
| 9,204,947 | B2 | | 12/2015 | Bovenkamp et al. | |
| 9,223,903 | B2 | | 12/2015 | Lamb et al. | |
| 9,259,302 | B2 | | 2/2016 | Miller | |
| 9,277,979 | B2 | | 3/2016 | Ikkink et al. | |
| 9,326,594 | B2 | | 5/2016 | De Vries et al. | |
| 9,333,048 | B2 | | 5/2016 | Li et al. | |
| 9,345,408 | B2 | | 5/2016 | Curry et al. | |
| 9,346,180 | B2 | | 5/2016 | Molema et al. | |
| 9,383,146 | B2 | | 7/2016 | Yang | |
| 9,402,463 | B2 | | 8/2016 | Schmalhurst et al. | |
| 9,408,681 | B2 | | 8/2016 | Bates et al. | |
| 9,427,078 | B2 | | 8/2016 | Farrell et al. | |
| 9,498,053 | B2 | | 11/2016 | Patel | |
| 9,498,312 | B2 | | 11/2016 | Dykes et al. | |
| 9,517,015 | B2 | | 12/2016 | Deane et al. | |
| 9,566,225 | B2 | | 2/2017 | Sagel et al. | |
| 9,628,014 | B2 | | 4/2017 | Klemm et al. | |
| 9,642,684 | B2 | | 5/2017 | Yoshida et al. | |
| 9,648,945 | B2 | | 5/2017 | Cook et al. | |
| 9,700,129 | B2 | | 7/2017 | Follows et al. | |
| 9,700,211 | B2 | | 7/2017 | Simons et al. | |
| 9,723,993 | B2 | | 8/2017 | Vermeulen | |
| 9,724,001 | B2 | | 8/2017 | Dykes et al. | |
| 9,750,586 | B2 | | 9/2017 | Hwang et al. | |
| 9,762,437 | B2 | | 9/2017 | Apte et al. | |
| 9,811,636 | B2 | | 11/2017 | Dykes et al. | |
| 9,814,552 | B2 | | 11/2017 | Spruit et al. | |
| 9,888,763 | B2 | | 2/2018 | Doll et al. | |
| 9,901,430 | B2 | | 2/2018 | Boughorbel | |
| 9,927,422 | B2 | | 3/2018 | Drake et al. | |
| 10,034,730 | B2 | | 7/2018 | Skaanland et al. | |
| 10,080,633 | B2 | | 9/2018 | Meerbeek et al. | |
| 10,114,354 | B2 | | 10/2018 | Simeth et al. | |
| 10,117,508 | B2 | | 11/2018 | Vetter et al. | |
| 10,172,443 | B2 | | 1/2019 | Wang et al. | |
| 10,172,552 | B2 | | 1/2019 | Ohmer et al. | |
| 10,188,203 | B2 | | 1/2019 | Van Gool et al. | |
| 10,226,314 | B2 | | 3/2019 | Meerbeek et al. | |
| 10,299,902 | B2 | | 5/2019 | Vetter et al. | |
| 10,314,387 | B2 | | 6/2019 | Jungnickel et al. | |
| 10,349,733 | B2 | | 7/2019 | Serval et al. | |
| 10,398,538 | B2 | | 9/2019 | Gatzemeyer et al. | |
| 10,426,254 | B2 | * | 10/2019 | Hardeman | A61C 17/221 |
| 10,441,393 | B2 | | 10/2019 | Miller | |
| 10,667,891 | B2 | | 6/2020 | Goddard et al. | |
| 10,813,731 | B2 | | 10/2020 | Shreve | |
| 10,835,028 | B2 | | 11/2020 | Gatzemeyer et al. | |
| 11,043,141 | B2 | | 6/2021 | Gatzemeyer | |
| 11,213,120 | B2 | | 1/2022 | Gatzemeyer | |
| 11,523,678 | B2 | | 12/2022 | Yang et al. | |
| 11,533,986 | B2 | | 12/2022 | Pesach et al. | |
| 11,602,216 | B2 | | 3/2023 | Gatzemeyer et al. | |
| 11,634,101 | B2 | * | 4/2023 | Ricart | B60N 2/002 701/45 |
| 11,666,139 | B2 | | 6/2023 | Serval et al. | |
| 11,841,447 | B2 | * | 12/2023 | Nguyen | G06N 3/09 |
| 11,931,028 | B2 | * | 3/2024 | Shelton, IV | A61B 17/32 |
| 12,023,022 | B2 | * | 7/2024 | Leimbach | G05F 1/61 |
| 12,090,013 | B2 | * | 9/2024 | Payne | A46B 15/0038 |
| 12,295,486 | B2 | * | 5/2025 | Serval | A46B 15/0004 |
| 2003/0011569 | A1 | | 1/2003 | Onodera | |
| 2005/0136384 | A1 | * | 6/2005 | Jarvis | G09B 19/0084 434/263 |
| 2005/0272001 | A1 | | 12/2005 | Blain et al. | |
| 2006/0004024 | A1 | | 1/2006 | Kim et al. | |
| 2006/0008787 | A1 | | 1/2006 | Hayman et al. | |
| 2006/0012357 | A1 | | 1/2006 | Lin et al. | |
| 2007/0002738 | A1 | | 1/2007 | McGee | |
| 2007/0010506 | A1 | | 1/2007 | Chang et al. | |
| 2007/0026118 | A1 | | 2/2007 | Frump, Jr. et al. | |
| 2007/0065792 | A1 | | 3/2007 | Schubarth | |
| 2007/0209585 | A1 | | 9/2007 | Ebensberger et al. | |
| 2007/0209586 | A1 | | 9/2007 | Ebensberger et al. | |
| 2008/0025672 | A1 | | 1/2008 | Boutoussov et al. | |
| 2008/0028553 | A1 | | 2/2008 | Batthauer | |
| 2008/0029576 | A1 | | 2/2008 | Shelton et al. | |
| 2008/0102953 | A1 | * | 5/2008 | Schultz | A63F 13/211 463/37 |
| 2008/0109973 | A1 | * | 5/2008 | Farrell | A61C 17/224 15/4 |

(56) References Cited

U.S. PATENT DOCUMENTS

2009/0000743 A1 1/2009 Hawes et al.
2009/0007094 A1 1/2009 Hinton et al.
2009/0021501 A1 1/2009 Umezaki
2009/0024127 A1 1/2009 Lechner et al.
2009/0027193 A1 1/2009 Nagy et al.
2009/0038639 A1 2/2009 Yetukuri et al.
2009/0092955 A1* 4/2009 Hwang .................. G16H 20/40 434/263
2010/0002414 A1 1/2010 Meir et al.
2010/0002816 A1 1/2010 Mody et al.
2010/0026927 A1 2/2010 Jee et al.
2010/0030930 A1 2/2010 Connor
2010/0031914 A1 2/2010 Fukumoto et al.
2011/0004577 A1 1/2011 Jung et al.
2011/0007663 A1 1/2011 Scotton et al.
2011/0008162 A1 1/2011 Yokoyama et al.
2011/0022984 A1 1/2011 van der Meulen et al.
2011/0024715 A1 2/2011 Jo et al.
2011/0027542 A1 2/2011 Nagai et al.
2011/0029409 A1 2/2011 Ganz et al.
2011/0029756 A1 2/2011 Biscondi et al.
2011/0059425 A1* 3/2011 Drake .................. G09B 23/283 427/430.1
2012/0017165 A1 1/2012 Gardner et al.
2012/0029521 A1 2/2012 Coale
2012/0122062 A1* 5/2012 Yang .................... G09B 19/003 434/219
2012/0151697 A1 6/2012 Farrell et al.
2012/0171657 A1* 7/2012 Ortins ................ A46B 15/0012 434/365
2012/0291212 A1 11/2012 Montagnino et al.
2013/0012532 A1 1/2013 Nagata et al.
2013/0018006 A1 1/2013 King
2013/0020300 A1 1/2013 Albrecht
2013/0020459 A1 1/2013 Moriyama et al.
2013/0177863 A1* 7/2013 Shreve ............... A46B 15/0004 433/27
2014/0002206 A1 1/2014 Apte et al.
2014/0002291 A1 1/2014 Apte et al.
2014/0002294 A1 1/2014 Apte et al.
2014/0002306 A1 1/2014 Apte et al.
2014/0006558 A1 1/2014 Zhao et al.
2014/0009100 A1 1/2014 Sera
2014/0025061 A1 1/2014 Benamou
2014/0031090 A1 1/2014 Hart et al.
2014/0162224 A1 6/2014 Wallace et al.
2014/0215370 A1* 7/2014 Berry ................. A46B 15/0008 715/769
2014/0359959 A1 12/2014 Jungnickel et al.
2015/0011374 A1 1/2015 Nonaka et al.
2015/0013436 A1 1/2015 Heaton et al.
2015/0014177 A1 1/2015 Kretschmer et al.
2015/0157122 A1 6/2015 Prescott
2015/0202030 A1 7/2015 Miller
2015/0217465 A1 8/2015 Krenik
2015/0230898 A1 8/2015 Miller
2015/0230899 A1 8/2015 Vetter et al.
2015/0244773 A1 8/2015 Wang et al.
2015/0305626 A1 10/2015 Deane et al.
2015/0320531 A1 11/2015 Van Gool et al.
2015/0381923 A1* 12/2015 Wickenkamp ......... H04N 5/783 386/344
2016/0022398 A1 1/2016 Vetter et al.
2016/0143718 A1 5/2016 Serval et al.
2016/0242652 A1 8/2016 Van Putten et al.
2016/0287363 A1* 10/2016 Miller .................. A61C 17/221
2016/0296163 A1 10/2016 Chaudhry et al.
2016/0310248 A1* 10/2016 Meerbeek .............. A46B 9/026
2016/0331115 A1* 11/2016 Follows .................. A46B 7/08
2016/0338635 A1 11/2016 Johnson et al.
2016/0343270 A1 11/2016 Zheng et al.
2017/0056146 A1* 3/2017 Boughorbel ......... A61C 17/221
2017/0116665 A1 4/2017 Alzahrani
2017/0181820 A1* 6/2017 Goddard ................ A61C 17/22
2017/0206804 A1* 7/2017 Roszyk ................. A63F 13/245
2017/0280864 A1 10/2017 Lolling
2017/0318954 A1 11/2017 Nishiura et al.
2018/0020819 A1 1/2018 Steckling
2018/0137774 A1 5/2018 Gatzemeyer
2018/0184857 A1* 7/2018 Pai ....................... A46B 5/0012
2018/0236675 A1 8/2018 Westerhof et al.
2019/0008270 A1 1/2019 Hardeman et al.
2020/0253368 A1 8/2020 Laurent et al.
2021/0256871 A1 8/2021 Gatzemeyer
2021/0330067 A1 10/2021 Gatzemeyer et al.
2022/0079329 A1 3/2022 Gatzemeyer
2023/0240438 A1 8/2023 Gerhardt et al.

FOREIGN PATENT DOCUMENTS

CN 101426450 5/2009
CN 101534745 9/2009
CN 102405029 4/2012
CN 202270341 6/2012
CN 103099423 5/2013
CN 103140189 6/2013
CN 204393684 6/2015
CN 204393685 6/2015
CN 104765952 7/2015
CN 105744911 7/2016
DE 10224043 12/2003
DE 10255722 6/2004
DE 102013015537 12/2014
GB 2097663 11/1982
IN 234961 1/2007
IN 200601965 8/2007
IN 200804686 8/2008
IN 201204976 10/2013
IN 201306137 12/2014
JP H10137040 5/1998
JP 2001-327331 11/2001
JP 2002-181812 6/2002
JP 2003-093416 4/2003
JP 2006-235809 9/2006
JP 2010-172384 8/2010
JP 04543663 9/2010
JP 2012-086022 5/2012
JP 2014-023796 2/2014
KR 20070103055 10/2007
RU 2388430 4/2009
WO 1999/047020 9/1999
WO 2006/098719 9/2006
WO 2007/032015 3/2007
WO 2007/122491 11/2007
WO 2008/058817 5/2008
WO 2008/060482 10/2008
WO 2008/147360 12/2008
WO 2009/001295 12/2008
WO 2010/129755 11/2010
WO 2010/134049 11/2010
WO 2010/134051 11/2010
WO 2012/042493 4/2012
WO 2013/084403 6/2013
WO 2014/016718 1/2014
WO 2014/097022 6/2014
WO 2014/097135 6/2014
WO 2014/097240 8/2014
WO 2015/003939 1/2015
WO 2015/092125 6/2015
WO 2015/092626 6/2015
WO 2015/140340 9/2015
WO 2015/177661 11/2015
WO 2016/016323 2/2016
WO 2016/020780 2/2016
WO 2016/020803 2/2016
WO 2016/046701 3/2016
WO 2016/047793 3/2016
WO 2016/097907 6/2016
WO 2018/089886 5/2018

(56) References Cited

FOREIGN PATENT DOCUMENTS

| | | |
|---|---|---|
| WO | 2018/089888 | 5/2018 |
| WO | 2018/089899 | 5/2018 |

OTHER PUBLICATIONS

Philips FlexCare+ Sonic Electric Toothbrush HX6993_03 _ Sonicare, https://web.archive.org/web/20160313041800/https://www.philips.com.au/pp/HX6993_03/sonicare-flexcare-plus-sonic-electric-toothbrush; retrieved on Aug. 24, 2020, published Mar. 13, 2016 per Wayback Machine, pp. 1-5.

International Search Report and Written Opinion of the International Searching Authority in International Application No. PCT/US2017/061285, mailed Feb. 27, 2018.

International Search Report and Written Opinion of the International Searching Authority in International Application No. PCT/US2017/061291, mailed Feb. 27, 2018.

International Search Report and Written Opinion of the International Searching Authority in International Application No. PCT/US2017/061321, mailed Feb. 27, 2018.

* cited by examiner

ORAL CARE SYSTEM AND METHOD

CROSS REFERENCE TO RELATED APPLICATIONS

The present application is a continuation of U.S. patent application Ser. No. 15/350,285, filed Nov. 14, 2016, which is incorporated herein by reference in its entirety.

BACKGROUND

To improve oral care routines, an oral care system can suggest a brushing routine. Further, an oral care system can utilize one or more sensors to evaluate the effectiveness of a brushing session. These approaches, however, do not consider that a user may have different goals for different brushing sessions. For example, while an evening brushing session may be intended for a deep cleaning, an afternoon brushing session may be intended as a quick cleaning to remove noticeable food particles and freshen the breath. Thus, there is need for a method of determining a brushing routine and/or evaluating a brushing session that considers the user's brushing goals.

BRIEF SUMMARY

The present disclosure may be directed, in one aspect, to an oral care system including a toothbrush; a user interface configured to receive a brushing goal from a user; and a programmable processor operably coupled to the user interface, the programmable processor configured to receive brushing goal data indicative of the brushing goal received by the user interface; and determine, based at least in part on the brushing goal data, at least one of a suggested brushing routine and a brushing evaluation for a brushing session.

In another aspect, an oral care method includes receiving, at a user interface, a brushing goal from a user; generating brushing goal data indicative of the brushing goal received by the user interface; and determining, at a programmable processor, at least one of a suggested brushing routine that is based at least in part on the brushing goal data; and a brushing evaluation for a brushing session that is based at least in part on the brushing goal data.

In yet another aspect, an oral care system includes a toothbrush; and a data processing unit comprising a user interface configured to receive a brushing goal from a user; and a programmable processor operably coupled to the user interface, the programmable processor configured to receive brushing goal data indicative of the brushing goal received by the user interface; determine a suggested brushing routine based at least in part on the brushing goal data; and determine a brushing evaluation for a brushing session based at least in part on the brushing goal data and brushing data from the brushing session.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1A:
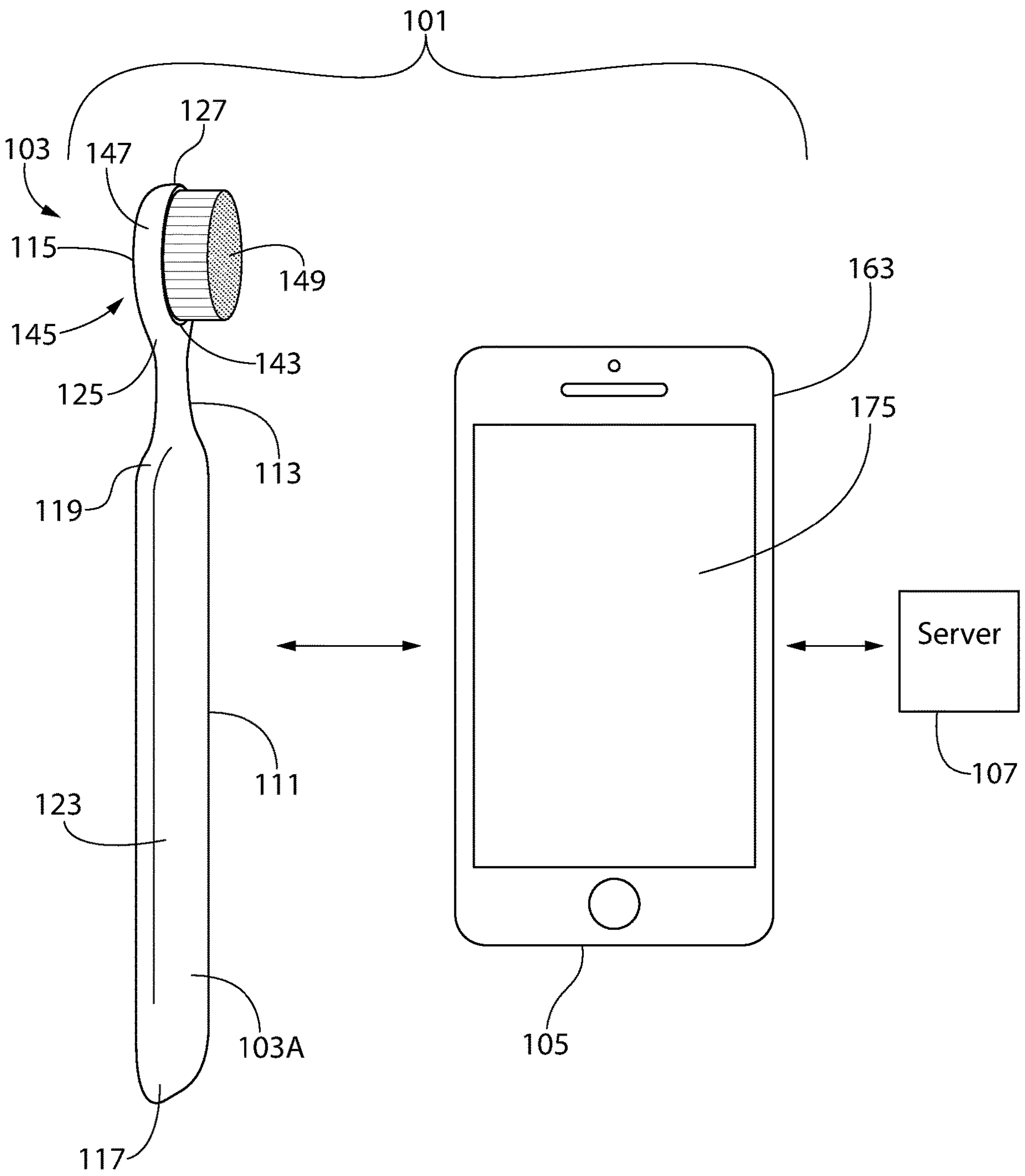
FIG. 1A illustrates an oral care system according to an embodiment of the present invention.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Turning in detail to the drawings, FIG. 1A illustrates an oral care system 101 in accordance with an embodiment of the present invention. The oral care system 101 includes a toothbrush 103 and a data processing unit 105. The data processing unit 105 may communicate with a server 107 for purposes of storing larger amounts of data or to provide server-side processing functionality. The presence of the server 107 and communication between the data processing unit 105 and the server 107, however, are not limiting of the present invention, unless specifically set forth in a claim.

The toothbrush 103 may be of any type that includes teeth cleaning elements suitable for cleaning teeth, and therefore is not limited to the toothbrush 103 illustrated as part of the exemplary embodiment. The toothbrush 103 shown in FIG. 1A generally includes a handle 111, a neck 113, and a head 115. The neck 113 extends between the handle 111 and the head 115 and connects the head 115 to the handle 111. The handle 111 provides the user with a mechanism by which the toothbrush 103 can be readily gripped and manipulated during a brushing session. The handle 111 may be formed of many different shapes, sizes and materials and may be formed by a variety of manufacturing methods that are well-known to those skilled in the art. The handle 111 extends from a proximal end 117 to a distal end 119 to form an elongated gripping portion 123 therebetween. The handle 111 transitions into the neck 113 at the distal end 119. While the neck 113 generally has a smaller transverse cross-sectional area than the handle 111, the invention is not so limited. Broadly speaking, the neck 113 forms a transition region between the handle 111 and the head 115, with the head 115 extending from a proximal end 125 at the end of the neck 113 opposite the handle 111 to a distal end 127. While the head 115 is normally widened relative to the neck 113, in some embodiments the head 115 can simply be a continuous extension or narrowing of the neck 113 and/or handle 111.

The handle 111, the neck 113, and the head 115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 111, the neck 113, and the head 115 of the toothbrush 103 may be formed as a single unitary structure using a molding, milling, machining, or other suitable process. In certain embodiments, the neck 113 may be made from a material which is more flexible than the handle 111 or the head 115, and in such embodiments, the flexibility of the neck 113 provides the head 115 with mobility with respect to the handle 111. Whether the handle 111, the neck 113, and the head 115 are of a unitary or multi-piece construction (including connection techniques) is not limiting of the present invention, unless specifically set forth in a claim. In some embodiments of the invention, the head 115 can have a first portion that is flexibly attached to a second portion of the head 115. During brushing, the first portion can move with respect to the second portion to enhance the brush head's ability to reach certain portions of the dentiture. In some embodiments of the invention, the head 115 may be detachable (and replaceable) from the handle 111 and/or from the neck 113 using techniques known in the art.

The head 115 generally includes a front surface 143, a rear surface 145 and peripheral side surfaces 147 that extend between the front and rear surfaces 143, 145. The front surface 143 and the rear surface 145 of the head 115 can take on a wide variety of shapes and contours, none of which are limiting of the present invention. For example, the front and rear surfaces 143, 145 can be planar, contoured or combinations thereof.

The front surface 143 of the head 115 includes at least one teeth cleaning element, shown in the exemplary embodiment as a plurality of bristles 149, extending therefrom for cleaning teeth surfaces. As used herein, the term "teeth cleaning element" is used in a generic sense to refer to any structure that can be used to clean or polish the teeth through relative surface contact. In certain embodiments, the head 115 may include a single teeth cleaning element, and in other embodiments, the head 115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 149 of the toothbrush 111 can be connected to the head 115 in any manner known in the art. For example, staples/anchors, in-mold tufting (IMT) or anchor free tufting (AFT) could be used to mount the bristles 149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figure 1B:
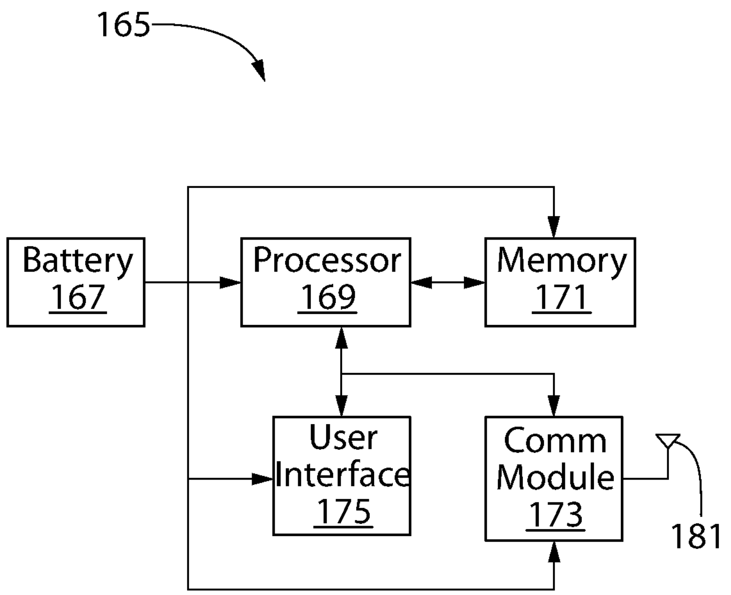
FIG. 1B is a schematic of the electronic circuitry of the data processing unit of FIG. 1A.

Referring to both FIGS. 1A and 1B, the data processing unit 105 includes a housing 163 and electronic circuitry 165, with the housing 163 enclosing and/or supporting the various components of the electronic circuitry 165. The electronic circuitry 165 includes a power source, shown as a battery 167 in the exemplary embodiment. Of course, the invention is not so limited, and other types of power sources may be used. The electronic circuitry 165 of the data processing unit 105 also includes a processor 169 communicably coupled to a memory 171, a communication module 173, and a user interface 175.

In certain embodiments, the electronic circuitry 165 may include other components, such as a speaker to provide audible feedback to the user, one or more buttons to receive input from the user, and one or more ports for making a wired connection between the electronic circuitry 165 and other circuitry external to the data processing unit 105. In certain other embodiments, the data processing unit 105 may be a smartphone, a tablet computer, a laptop computer, and the like, although the invention is not so limiting. In the exemplified embodiment, the electronic circuitry 165 is located within housing 163 of the data processing unit 105, this housing 163 being separate and distinct from the housing 103A of the toothbrush 103 In other embodiments, such as that discussed below with respect to FIG. 4, the electronic circuitry 165 or certain components thereof may be located within the housing 103A of the toothbrush 103.

The memory 171 may be any appropriate type of memory or storage which enables the processor 169 to perform the desired programming, such as volatile and/or non-volatile random access memory. The particular type of storage used for the memory 171 is not to be limiting of the invention.

In the exemplified embodiment, the user interface 175 is a touch-sensitive display which accepts input from the user directly on the display surface. The display may be any type of light emitting display, and as shown in the exemplary embodiment, the display may be an LED panel. In certain other embodiments, the display may be an LCD panel, an OLED panel, or any other type of display which is electronically controllable by the programmable processor 169 to provide visual feedback to the user. As will be discussed below, the user interface is not limited to the exemplary embodiment, but can comprise any device or method by which a user interacts with the data processing unit or a programmable processor. For example, in other embodiments the user interface can utilize a non-touch-sensitive graphical user interface, buttons, a dial, a keyboard, and/or a mouse.

The communication module 173 may include an antenna 181 to enable wireless transmission of communication signals. The communication module 173 may be configured and/or programmed to communicate using a wireless technology standard such as Wi-Fi, Bluetooth®, and the like, or it may communicate using any type of proprietary wireless transmission protocol. The mode of communication for which the communication module 173 is configured is not limiting of the invention unless specifically set forth in a claim. In certain embodiments, the communication module 173 may include a port to enable communications using wires and wired protocols, such as USB and the like.

The communication module 173 of the data processing unit 105 may be configured and/or programmed to communicate with the server 107. The communication module 173 may communicate with the server 107 over any combination of public and/or private network, and the communications may be wired, wireless, or a combination of the two. In certain embodiments, the communication module 173 may communicate with the server 107 over the Internet using one or more types of communication protocols. In certain embodiments, the server 107 may be programmed with one or more application programming interfaces (APIs) which provides server-side functionality to the data processing unit 105.

Figure 2:
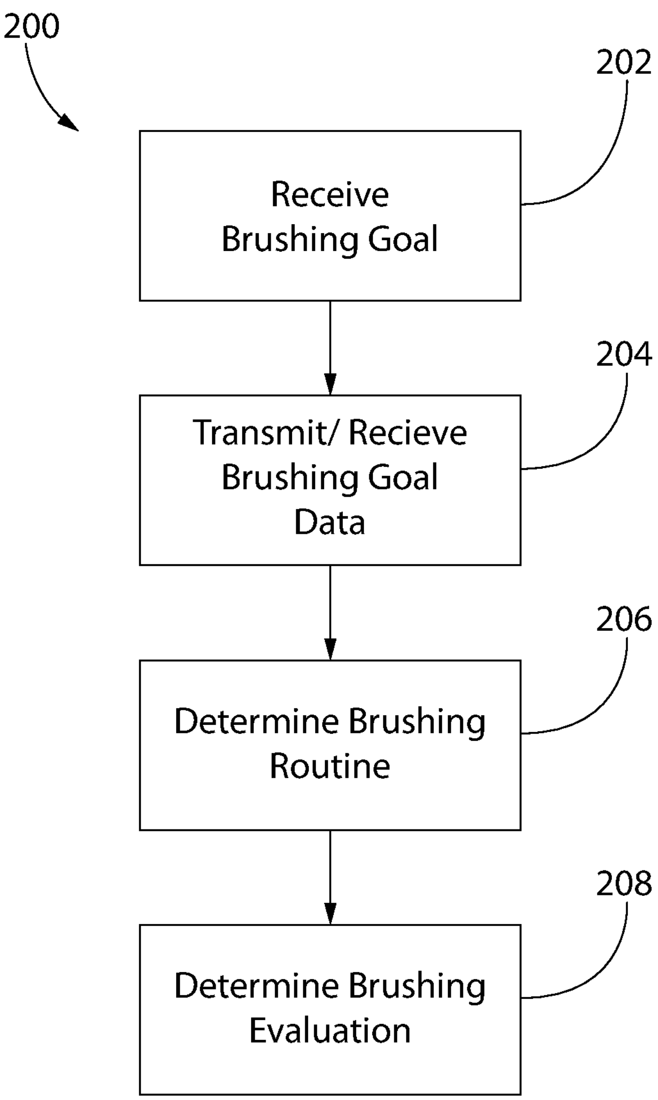
FIG. 2 is a flowchart showing a process for determining a brushing routine and a brushing evaluation from a brushing goal according to an embodiment of the invention.

FIG. 2 is a flowchart showing a process 200 for determining a brushing routine and a brushing evaluation from a brushing goal according to an embodiment of the invention. The exemplified process 200 may be implemented as programming for the programmable processor 169 of the data processing unit 105. For convenience, as part of the description below, reference will also be made to the hardware components of the data processing unit 105 discussed above in FIG. 1B. While in the exemplified embodiment the processor 169 and other electronic circuitry 165 form part of the data processing unit, the disclosure is not so limited. For example, in other embodiments, a processor forming part of the toothbrush can carry out the steps carried out by processor 169 in the embodiments discussed herein.

In a first operation, the user interface 175 receives a brushing goal (operation 202). In the exemplified embodiment, the brushing goal is received by the user through a touch-sensitive display, though the brushing goal can be received through any user interface. The brushing goal can be any objective for a brushing session. In one embodiment, the brushing goal can be chosen from two options: a standard deep cleaning and a quick refreshing cleaning. In other embodiments, the brushing goal can be chosen from alternative options, such as a mild, moderate, or heavy cleaning. In yet other options, the brushing goal can be a cleaning that is focused on removing particles from the front teeth, a cleaning that is focused on removing food from the molars, or a cleaning for a set period of time.

In a further operation, brushing goal data can be generated, transmitted, and/or received, the brushing goal data being indicative of the brushing goal received by the user interface (operation 204). For purposes of the present disclosure, the term "brushing goal data" is any type of information indicative of a brushing goal of a user, including information extracted or derived from other information or data indicative of a brushing goal, regardless of the form of the extracted information, and combinations thereof. The brushing goal data may be in the form of mathematical data, analog data, and/or digital data. In the exemplified embodiment, the user interface 175 receives the brushing goal, generates brushing goal data based on the brushing goal, and transmits the brushing goal data to the programmable processor 169. But the invention is not so limited. For example, in other embodiments, the programmable processor can work with the user interface to receive and process brushing goal data.

In a further operation, a suggested brushing routine is determined based at least in part on the brushing goal data (operation 206). The suggested brushing routine can be any one or more steps or instructions for brushing teeth. The determination of the suggested brushing routine may be achieved in any number of ways. In certain embodiments, the suggested brushing routine may be determined by presenting the user with a list of potential brushing routines that accord with the selected brushing goal, and having the user select the suggested brushing routine from among the list of potential brushing routines. In certain embodiments, the suggested brushing routine may be determined by adjusting a standardized brushing routine based on the brushing goal data, or by adjusting a time based on the brushing goal data, as described below. In certain embodiments, the suggested brushing routine may be determined by selecting a predetermined brushing routine based on the brushing goal data and then adjusting the predetermined brushing routine based on a user brushing history. In such embodiments, the user brushing history may be based upon brushing session data collected from previous brushing sessions of the user. Such brushing session data may be based upon brush stroke, brushing aggressiveness, or upon any other measure of brushing effectiveness. In addition, such brushing session data may be saved in the memory 171 of the data processing unit 105 or in a memory of the server 107. In still other embodiments, one or more of the aforementioned processes for determining the suggested brushing routine may be used in combination.

In one embodiment, the suggested brushing routine is determined by adjusting an optimum brushing time based on the brushing goal data to determine the brushing time for the suggested brushing routine. In this embodiment, the optimum brushing time is predetermined from a standardized brushing routine. The standardized brushing routine may be an industry standard brushing routine in which the optimum brushing time is 2 minutes. This process can begin with the brushing goal data being received by the data processing unit 105. Next, the data processing unit 105 determines an offset time based on the brushing goal data. For example, if the goal is a quick refresh of the oral cavity, then the offset time may be a negative number. Following the offset time determination, the target brushing time for the brushing routine is calculated. As part of this step, the programmable processor 169 of the data processing unit 105 calculates the target brushing time by retrieving an optimum time which is stored in the memory 171 and adding the determined offset time to the optimum time. The determined target brushing time can then be displayed, and the user can be instructed to begin the suggested brushing routine. In certain embodiments, the processor 169 of the data processing unit 105 may provide other specific instructions for the brushing routine, such as the order for brushing different sections of the user's dentiture, the length of time to brush each section, which section to start with, and the like. When the brushing time has expired, the programmable processor 169 of the data processing unit 105 can instruct the user that the brushing routine is at an end.

In the exemplified embodiment, after determining the suggested brushing routine, there is a determination of a brushing evaluation based on the brushing goal data (step 208). As will be discussed in further detail below, the oral care system 101 can be configured to perform a brushing evaluation of a brushing session of a user. The brushing evaluation can be any assessment of the effectiveness of one or more brushing sessions. For example, the toothbrush 103 can include sensors, and data derived from the sensors can be used to determine the motion and/or location of the toothbrush. From this determination, the system 101 can determine how well the user brushed his or her teeth. In the exemplified embodiment, the evaluation is based in part on the brushing goal data. Thus, for example, while a brushing evaluation would typically provide a negative evaluation when the brushing session was only one minute, the brushing evaluation according to the invention need not be negative if the user indicated that the purpose of the given brushing session was only a quick refresh of the oral cavity. Accordingly, the user is not penalized in his brushing evaluation for carrying out a supplemental brushing session for refreshing his oral cavity. In one embodiment, the determination of the brushing evaluation is based on both brushing goal data and brushing data from a brushing session, the brushing data being derived from a sensor forming part of the toothbrush. Further, the brushing evaluation can be based on a comparison of the brushing data from the brushing session and the suggested brushing routine.

The brushing goal data can impact an evaluation of an individual brushing session, and can also impact an evaluation of a plurality of brushing sessions. Thus, while one-minute of brushing may be adequate for a modest brushing goal, carrying out only two one-minute brushing sessions per day will not be adequate, and a cumulative evaluation can reflect this. The cumulative evaluation will not penalize a user for meeting a modest brushing goal for a session, but will also ensure that general brushing goals are being met. Such general brushing goals can be based on established ideal brushing objectives, or can be individualized based on factors particular to the user.

In the foregoing method 200, the brushing goal data is used to both determine a suggested brushing routine and determine a brushing evaluation. It is noted, however, that in other embodiments the brushing goal data can be used to determine a suggested brushing routine but not to determine a brushing evaluation, or to determine a brushing evaluation but not to determine a suggested brushing routine.

Figure 3:
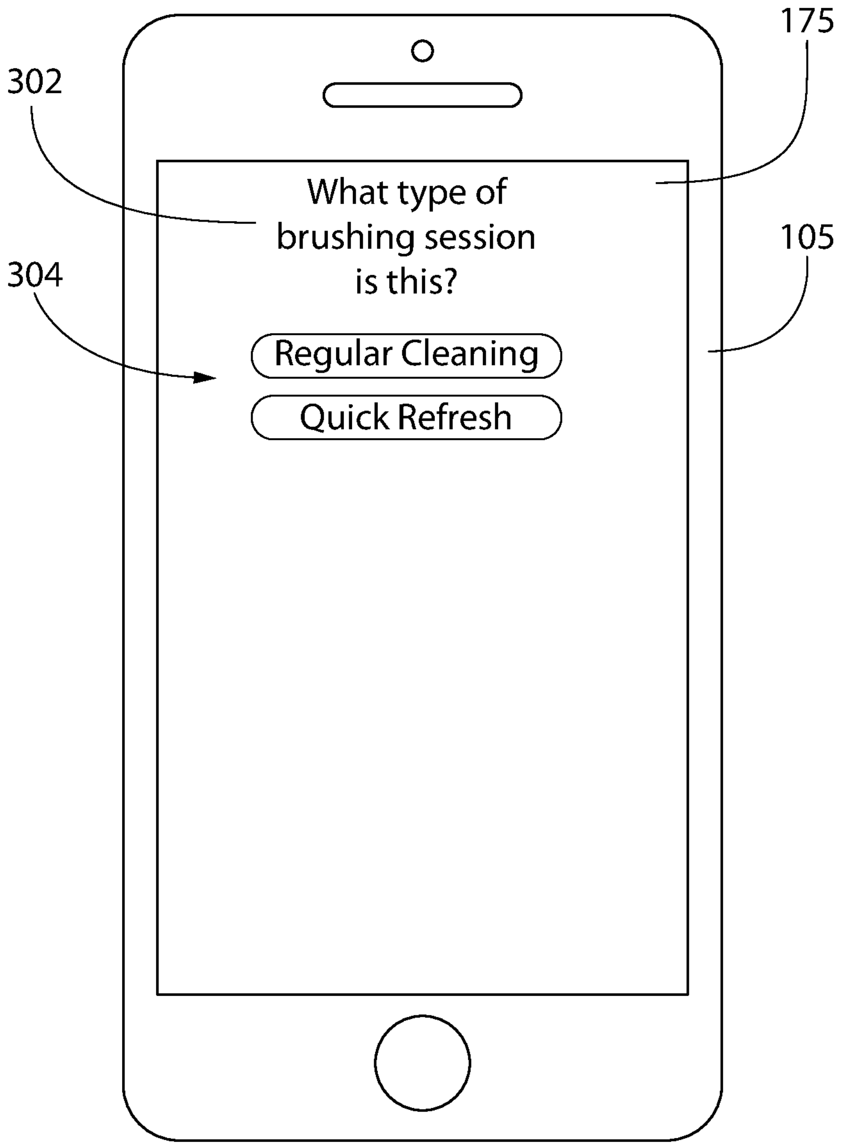
FIG. 3 illustrates a data processing unit having a user interface whereby a user inputs a brushing goal according to an embodiment of the invention.

FIG. 3 illustrates a data processing unit 105 having a user interface 175 according to one embodiment. Here, the user may input the brushing goal data through the user interface 175. In such embodiments, the data processing unit 105 may present to the user using the user interface one or more questions 302 concerning at least one brushing goal of the user, and then receive a selected answer 304 to the one or more questions. The questions and answers shown are merely exemplary in nature, and any of the brushing goals discussed herein (as well as others) can be the subject of a question or answer on a user interface for the purposes of receiving brushing goal data. In other embodiments, a user can type a goal and be provided with options that corresponded with the typed goal. In other embodiments, a series of questions or topics can be provided to the user by the user interface. For example, in addition to the type of brushing session, the user can be prompted to indicate the intended brushing time or an area of the oral cavity upon which the user would like to focus.

Figure 4:
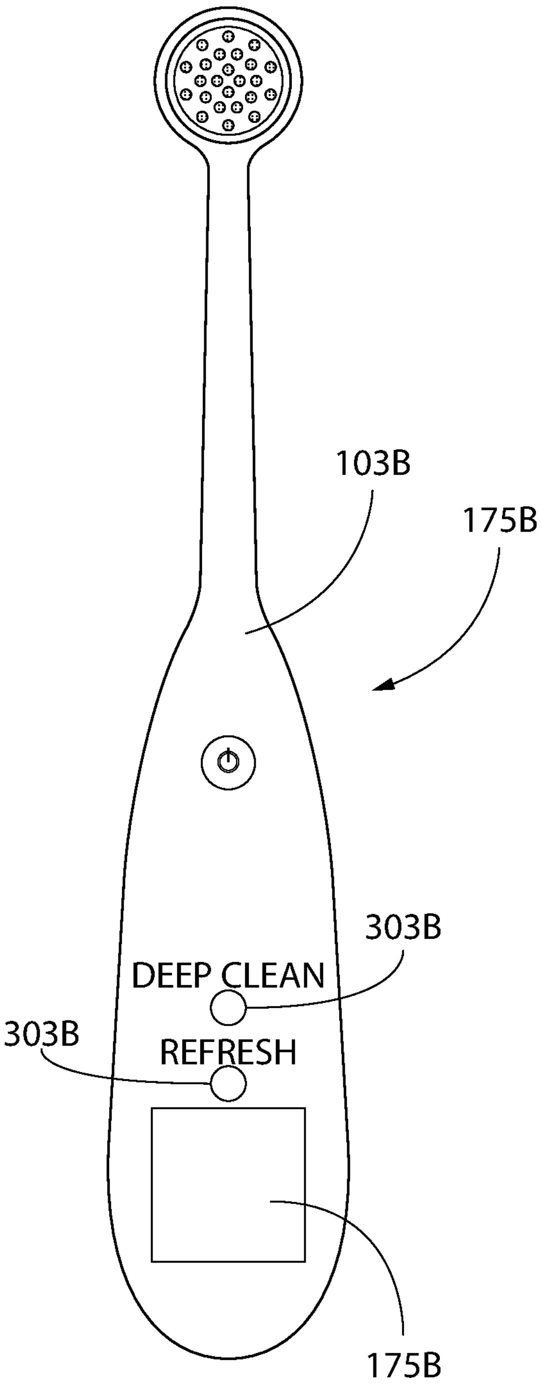
FIG. 4 illustrates a toothbrush comprising a user interface according to another embodiment of the invention.

FIG. 4 illustrates a toothbrush 103B comprising a user interface 175B according to another embodiment of the invention. In this embodiment, the toothbrush 103B comprises the user interface 175B and the programmable processor (not shown). The user interface 175B comprises buttons 303B for selecting a brushing goal option. Brushing goal data can be generated based on the button 303B pressed, and the brushing goal data can be utilized as discussed herein. The exemplified user interface 175B further comprises a display 175B. The display can provide information similar to the information displayed on the touch-sensitive display 175. For example, the display 175 can provide information regarding a suggested brushing routine, or brushing evaluation information. In other embodiments, other buttons indicative of other goals can be used. For example, a button can indicate increased or decreased brushing time, which can then be shown on the display 175B. In other embodiments, the display 175 can be omitted. In this case, the user can indicate his brushing goal using the buttons (or other user interface) on the toothbrush, but the determined routine or evaluation can appear elsewhere, such as on a data processing unit. Further, the toothbrush 103B can be any type of toothbrush, including a manual toothbrush or an electric toothbrush having an electrically-powered vibratory element.

Figure 5:
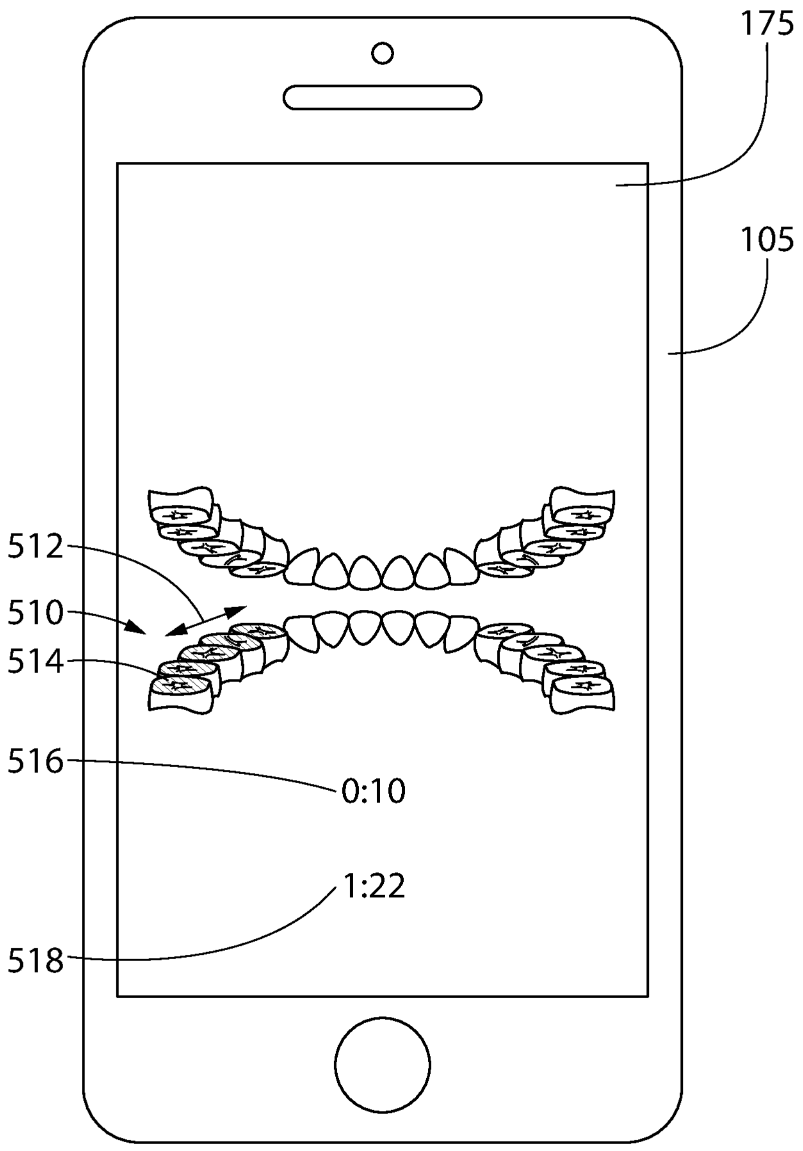
FIG. 5 illustrates a data processing unit having a user interface that provides brushing instructions for a brushing routine according to an embodiment of the invention.

FIG. 5 illustrates a data processing unit 105 having a user interface 175 that provides brushing instructions 510 for a brushing routine according to one embodiment, the instructions 510 being based in part on the brushing goal received. In this embodiment, the brushing instructions 510 comprise real-time directions for a user to follow during a brushing session. The instructions 510 comprise an indication 514 of a region of the dentiture to brush, an indication 512 of a brushing motion, and an indication 516 of a time remaining for brushing the specified region. In this embodiment, the user interface 175 also provides an indication 518 of the total brushing time remaining in the suggested brushing routine. In this embodiment, different screens may show different instructions as the user progresses through the different stages of the brushing routine, thus coaching the user on which regions to brush, which brushing motions to use, and for how long. In other embodiments, certain indications or instructions can be omitted. Also, other indications or instructions can be added, such as an indication of whether to apply greater or lesser pressure or brushing intensity. The instructions (such as motion, region, and time) can be based at least in part on the brushing goal of the user. Thus, for example, if the user desired only a quick refresh of the oral cavity, the routine could reflect this goal by decreasing the time to be less than a typical brushing session, or by changing the brushing motions provided or the brushing regions indicated to those more likely to promote fresh breath. Further, if the user wished to dedicate more time to removing food from the molars, the instructions could reflect this goal by extending the time dedicated to the molars from the time typically dedicated to the molars.

The suggested brushing routine can be determined by adjusting a preexisting brushing routine, the adjustment based at least in part on the brushing goal data. In other embodiments, the suggested brushing routine need not rely on a preexisting brushing routine.

Figure 6:
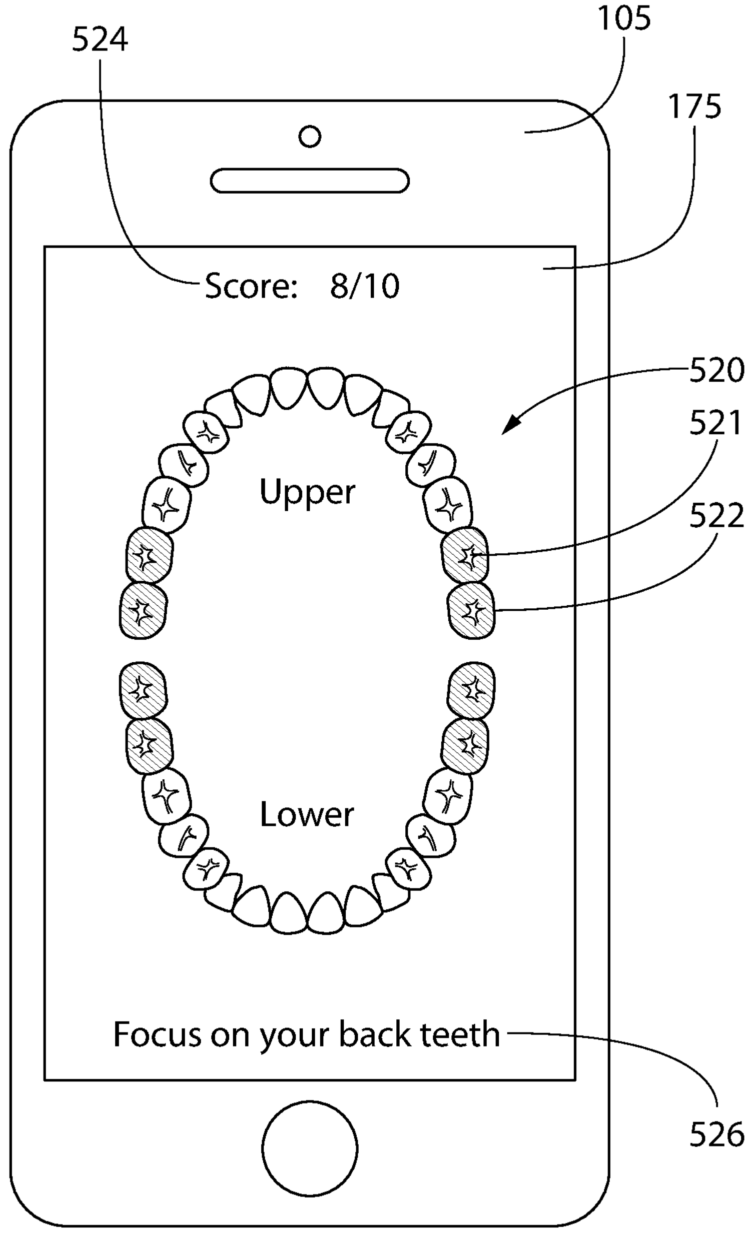
FIG. 6 illustrates a data processing unit having a user interface that provides an evaluation of a brushing session of a user according to an embodiment of the invention.

FIG. 6 illustrates a data processing unit 105 having a user interface 175 that provides an evaluation 520 of a brushing session of a user according to an embodiment of the invention. In this embodiment, the evaluation 520 comprises a visualization 521 of the user's dentiture. The dentiture can be divided into different regions, each of which the user is expected to brush during the brushing session. Brushing session data may be collected and processed according to the different regions of the dentiture. The collection of such brushing session data is described in more detail below with respect to FIGS. 8-10.

In the exemplified embodiment, the visualization 521 includes an indication 522 of a region of the dentiture not properly brushed. The evaluation 520 further comprises a recommendation 526 that provides the user advice on how to improve his or her brushing. The evaluation 520 also includes a performance metric 524 that indicates how well the user performed in brushing his or her teeth during the brushing session. In other embodiments, other metrics or visualizations can be used to indicate brushing performance, such as a percentage, or a number of stars (for example, three stars out of five). Further, as discussed above, in other embodiments, the evaluation can be a cumulative evaluation based on a plurality of brushing sessions and brushing goal data from those brushing sessions.

Figure 7:
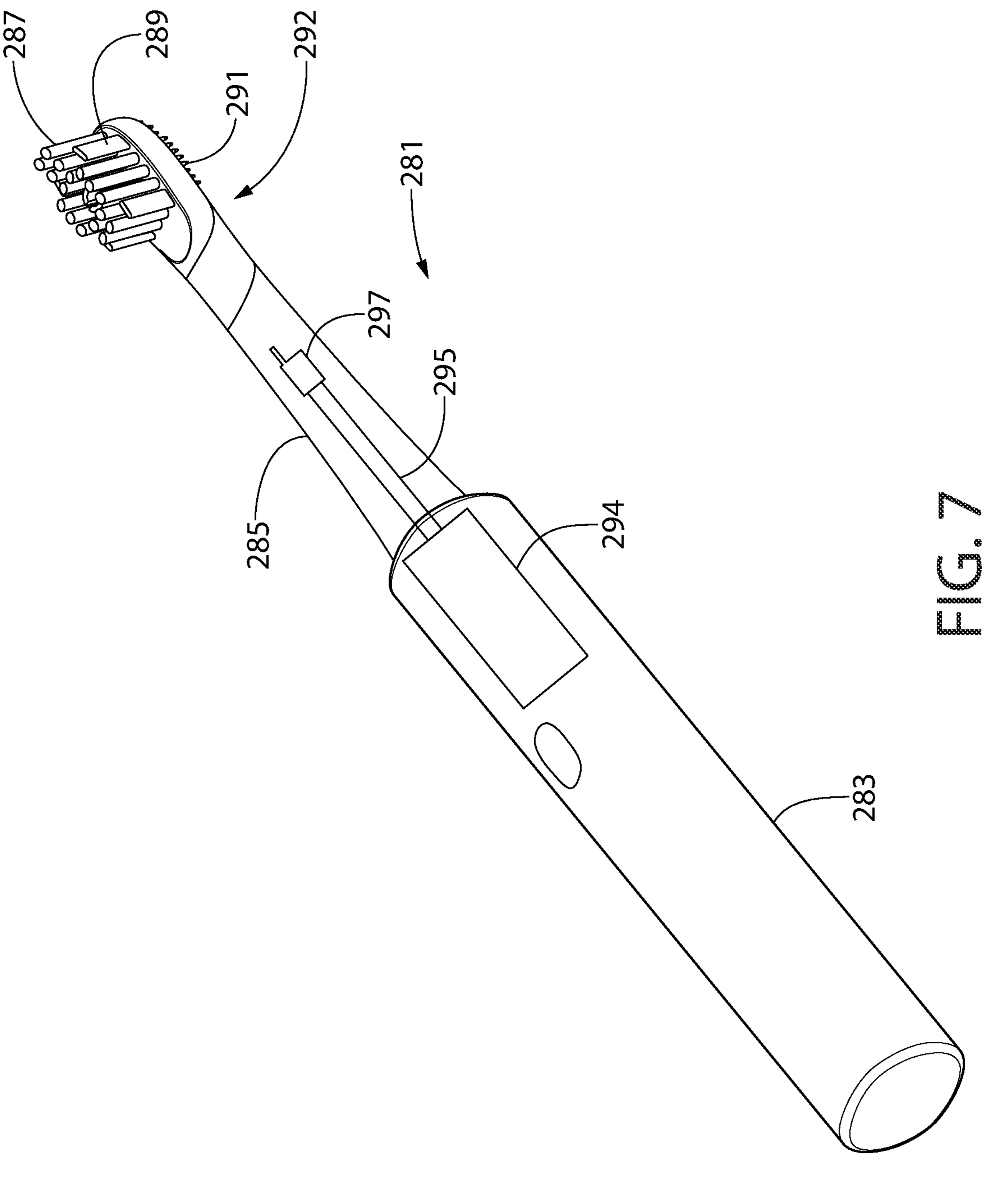
FIG. 7 illustrates an electronic toothbrush according to an embodiment of the invention.

FIG. 7 illustrates an electronic toothbrush 281 according to an embodiment of the invention. The electric toothbrush 281 includes a handle 283 and a refill head 285. In certain embodiments, the handle 283 and the refill head 285 are removably coupled to each other. In certain embodiments of electric toothbrushes, the control circuit 165 of the data processing unit 105 may reside at least partially within the handle 283. Alternatively, the handle 283 may include a separate toothbrush control circuit which controls the electric toothbrush and communicates with the data processing unit 105.

In this embodiment, the refill head 285 includes a bristle field 287 which includes at least one elastomeric element 289 and a tongue cleaner 291 on the back side 292 of the refill head 285. Also in this embodiment, shown schematically, the handle includes a motor 294 operably coupled to a shaft 295, with an eccentric mass 297 positioned at the distal end of the shaft 295. In combination, the motor 294, the shaft 295, and the eccentric mass 297 form an electrically-powered vibratory element.

Figure 8:
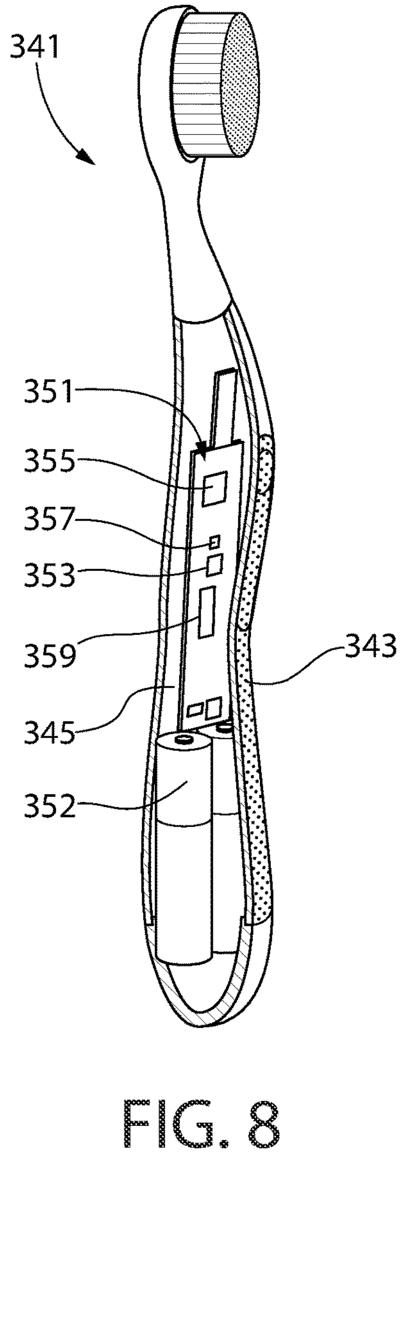
FIG. 8 illustrates a partial sectional view of a toothbrush having electronic circuitry for collecting brushing session data according to an embodiment of the invention.

FIG. 8 illustrates a partial sectional view of a toothbrush 351 having electronic circuitry for collecting brushing session data according to an embodiment of the invention. The handle 343 of the toothbrush 341 forms a housing for containing electronic circuitry 351 for collecting brushing session data. The handle 343 is a hollow structure in which a cavity 345 is formed. The electronic circuitry 351, which includes a power source 352, is located within the cavity. The electronic circuitry 351 may be used to collect and analyze brushing session data from which an evaluation of the brushing session may be made. In certain embodiments, the evaluation of the brushing session may be based at least in part upon the brushing goal data.

Figure 9:
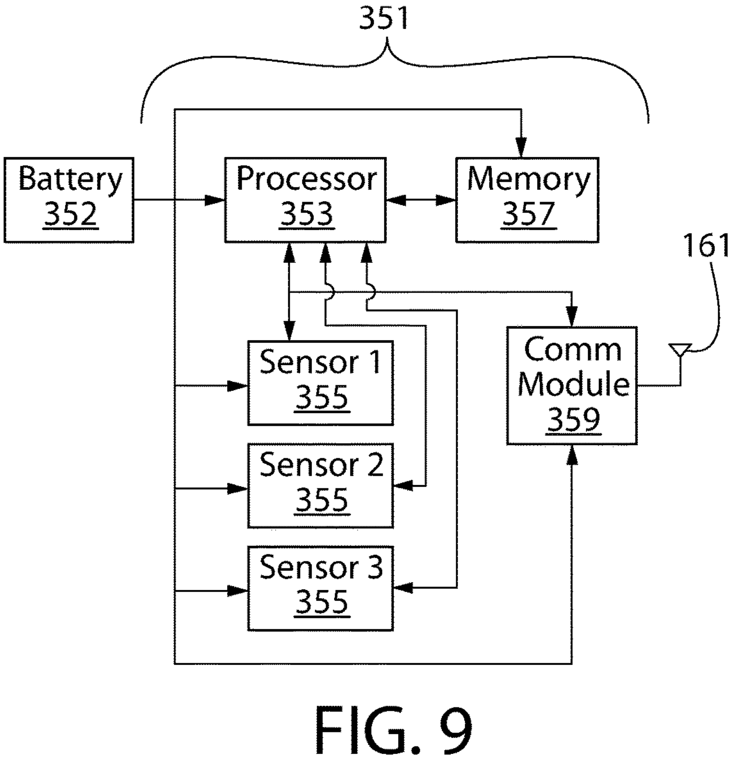
FIG. 9 is a schematic of the electronic circuitry of the toothbrush of FIG. 8.

FIG. 9 is a schematic of the electronic circuitry 351 of the toothbrush 341 of FIG. 8. The electronic circuitry 351 includes a processor 353 communicably coupled to sensors 355, a memory 357, and a communication module 359. The number of sensors 355 included as part of the electronic circuitry 351 depends upon the type of brushing session data to be detected and the functionality of each type of sensor employed. The brushing session data that is detected and collected may include position, motion, acceleration, frequency, and pressure against the surface of the teeth. Other types of brushing session data associated with a brushing session may also be detected and collected, and those listed herein are not to be limiting of the invention unless otherwise indicated in the claims. In certain embodiments, only one sensor 355 may be included as part of the electronic circuitry 351, and in other embodiments, two or more sensors 355 may be included. By way of example, the at least one sensor 355 may be any one or more of the following: a 3-axis accelerometer, a 6-axis accelerometer, a gyroscope, a magnetometer, a pressure sensor, among other types of sensors. In general, each sensor 355 included as part of the electronic circuitry 351 generates at least part of the brushing session data. For purposes of the present disclosure, the term "brushing session data" is any type of information which may be extracted or derived from a sensor or sensor signal, regardless of the form of the extracted information. By way of example, brushing session data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 353 and the memory 357 may be omitted from the electronic circuitry 351 of the toothbrush 341. In such embodiments, the sensors 355 may communicate brushing session data directly to the communication module for transmission.

The memory 357 may be any appropriate type of memory or storage which enables the processor 353 to perform the desired programming, such as volatile and/or non-volatile random access memory, or any other type of storage. The particular type of storage used for the memory 357 is not to be limiting of the invention. The communication module 359 in the exemplary embodiment includes an antenna 361 to enable wireless communication. The communication module 359 may be configured and/or programmed to communicate using a wireless technology standard such as Wi-Fi, Bluetooth®, and the like, or it may communicate using any type of proprietary wireless transmission protocol. In certain embodiments, the communication module 359 may include a port to enable communications using wires and wired protocols, such as USB and the like. The particular mode of communication used by the communication module is not limiting of the invention unless specifically set forth in a claim.

Figure 10:
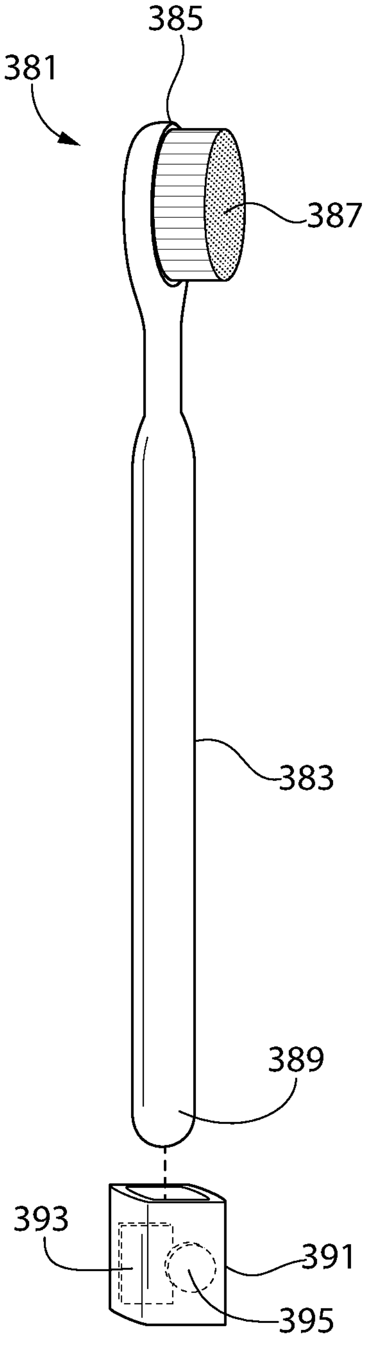
FIG. 10 illustrates a toothbrush dongle having electronic circuitry for collecting brushing session data.

FIG. 10 illustrates a toothbrush dongle 391 for collecting brushing session data. Generally, the toothbrush 381 includes a handle 383 and a head 385 to which a plurality of teeth cleaning elements 387 are affixed. The dongle 391 may be removably affixed to the proximal end 389 of the handle 383. The dongle 391 comprises a housing for containing electronic circuitry 393 and an associated a power source 395, which may be similar to that described above in connection with FIG. 9.

The brushing session data which is detected and collected by the toothbrush embodiments shown in FIGS. 8-10 may include a side-to-side linear brush stroke motion, an up and down linear brush stroke motion, a circular brush stroke motion, a flicking brush stroke motion, a brush stroke rate, and a pressure of the head of the toothbrush on the teeth, amongst others. During use, the brushing session data is generated during at least a portion of the brushing session. The brushing session data may be used to evaluate the brushing session by calculating one or more performance metrics, and the performance metric may represent brushing efficacy during one or more portions of the brushing session. The performance metric may express the efficacy of a brushing session, or even for portions of a brushing session, as a single number, and stored in the memory 171 of the data processing unit 105 for later use. In certain embodiments, the data processing device 105 may transmit the calculated performance metrics to the server 107 for storage and or additional analysis.

In certain embodiments, the performance metrics which are stored in the memory 171 of the data processing unit 105 or on the server 107 may be used during future brushing sessions to aid in determining what brushing routine to suggest to the user. For example, performance metrics may be used in combination with the brushing goal data to help determine the target brushing time for a brushing routine. Also, in embodiments in which performance metrics are stored, the performance metrics may be analyzed by machine learning processes, and the machine learning may be used to enhance future brushing routines.

The disclosed embodiments provide several advantages. For example, the system can provide a brushing routine that takes into consideration the brushing goal of the user. Thus, the brushing routine provided can reflect the objective of a user for a given brushing session, rather than providing the same standard routine regardless of the situation. Further, the system can provide a brushing evaluation that takes into consideration the brushing goal of the user. Thus, an evaluation can be based on what the user intended to accomplish during the brushing session, rather than judging the brushing session based on an unadaptable, one-size-fits-all standard.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention or inventions have been described with respect to specific examples, those skilled in the art will appreciate that there are numerous variations and permutations of the above described invention(s). It is to be understood that other embodiments may be utilized and structural and functional modifications may be made without departing from the scope of the present invention(s). Thus, the spirit and scope should be construed broadly as set forth in the appended claims.

What is claimed is:

1. An oral care system comprising: an electric toothbrush comprising a sensor configured to generate brushing data during a brushing session of a user, the sensor comprising an accelerometer, a gyroscope, a magnetometer, and a pressure sensor, and the brushing data indicative of a motion, a position, a frequency, and a pressure of the electric toothbrush during the brushing session;

a user interface configured to:

provide the user with brushing goal options for selection by the user, the brushing goal options comprising one or more of: an option for a brief refreshing of an oral cavity, an option for a regular cleaning of the oral cavity, and/or an option for a deep cleaning of the oral cavity; and receive a selected brushing goal option selected by the user from the provided brushing goal options; and a programmable processor operably coupled to the user interface, the programmable processor configured to:

receive brushing goal data indicative of the selected brushing goal option received by the user interface;

receive the brushing data from the sensor;

determine a suggested brushing routine to be displayed on the user interface, the suggested brushing routine based at least in part on the brushing goal data indicative of whether the user selected the option for a brief refreshing of an oral cavity, the option for a regular cleaning of the oral cavity, and/or the option for a deep cleaning of the oral cavity;

operate, via a toothbrush control circuit of the electric toothbrush that controls the electric toothbrush and communicates with the programmable processor, the electric toothbrush during the brushing session; and provide, on the user interface, real-time directions for the suggested brushing routine that are based at least in part on the brushing goal data, the real-time directions comprising region-specific time durations based on the user selection; and determine a brushing evaluation of the brushing session based at least in part on (a) the brushing goal data indicative of whether the user selected the option for a brief refreshing of an oral cavity, the option for a regular cleaning of the oral cavity, and/or the option for a deep cleaning of the oral cavity, and (b) the brushing data from the brushing session;

wherein the determination of the brushing evaluation comprises a determination of a plurality of performance metrics, and the user interface displays the plurality of performance metrics, expressed as a single number;

wherein the plurality of performance metrics are indicative of brushing efficacy; and wherein the suggested brushing routine is further determined by adjusting a predetermined brushing routine based at least in part on the brushing goal data.

2. The system as in claim 1 wherein the brushing goal options further comprise an option for focusing brushing on a particular region of the oral cavity.

3. The system as in claim 1 further comprising a smartphone, the smartphone comprising the programmable processor and the user interface, the user interface being a touchscreen.

4. The system as in claim 1 wherein the electric toothbrush comprises the user interface and the programmable processor.

5. The system as in claim 1 wherein the programmable processor is further configured to determine a cumulative brushing evaluation for a plurality of brushing sessions, the cumulative brushing evaluation based at least in part on brushing goal data for the plurality of brushing sessions.

6. An oral care method comprising:

providing a user, at a user interface, with brushing goal options for selection by the user, the brushing goal options comprising one or more of: an option for a brief refreshing of an oral cavity, an option for a regular cleaning of the oral cavity, and/or an option for a deep cleaning of the oral cavity, wherein the user has an electric toothbrush that comprises a sensor configured to generate brushing data during a brushing session of a user, the sensor comprising an accelerometer, a gyroscope, a magnetometer, and a pressure sensor, and the brushing data indicative of a motion, a position, a frequency, and a pressure of the electric toothbrush during the brushing session;

receiving, at the user interface, a selected brushing goal option selected by the user from the provided brushing goal options;

generating brushing goal data indicative of the selected brushing goal option received by the user interface;

receiving the brushing data from the sensor;

determining, at a programmable processor, a suggested brushing routine to be displayed on the user interface, the suggested brushing routine based at least in part on the brushing goal data indicative of whether the user selected the option for a brief refreshing of an oral cavity, the option for a regular cleaning of the oral cavity, and/or the option for a deep cleaning of the oral cavity;

operating, via a toothbrush control circuit of the electric toothbrush that controls the electric toothbrush and communicates with the programmable processor, the electric toothbrush during the brushing session; and providing, on the user interface, real-time directions for the suggested brushing routine that are based at least in part on the brushing goal data, the real-time directions comprising region-specific time durations based on the user selection; and determining, at the programmable processor, a brushing evaluation of the brushing session based at least in part on (a) the brushing goal data indicative of whether the user selected the option for a brief refreshing of an oral cavity, the option for a regular cleaning of the oral cavity, and/or the option for a deep cleaning of the oral cavity, and (b) the brushing data from the brushing session;

wherein the determination of the brushing evaluation comprises a determination of a plurality of performance metrics, and the user interface displays the plurality of performance metrics, expressed as a single number;

wherein the plurality of performance metrics are indicative of brushing efficacy; and wherein the suggested brushing routine is further determined by adjusting a predetermined brushing routine based at least in part on the brushing goal data.

7. The method as in claim 6 wherein the brushing goal options further comprise an option for focusing brushing on a particular region of the oral cavity.

8. The method as in claim 6 further comprising a smartphone, the smartphone comprising the programmable processor and the user interface, the user interface being a touchscreen.

9. The method as in claim 6 wherein the electric toothbrush comprises the user interface and the programmable processor.

10. The method as in claim 6 wherein the programmable processor is further configured to determine a cumulative brushing evaluation for a plurality of brushing sessions, the cumulative brushing evaluation based at least in part on brushing goal data for the plurality of brushing sessions.

11. The system of claim 1, wherein determining the suggested brushing routine comprises retrieving an optimum brushing time stored in memory and adding an offset time based on the brushing goal data to determine a target brushing time, and allocating times to regions of the dentiture based on the target brushing time, the user interface providing a time remaining for the region-specific time durations and a total brushing time remaining during the brushing session.

12. The method of claim 6, wherein determining the suggested brushing routine comprises retrieving an optimum brushing time stored in memory and adding an offset time based on the brushing goal data to determine a target brushing time, and providing, on the user interface, a time remaining for the region-specific time and a total brushing time remaining during the brushing session.

* * * * *